United States Patent [19]
Parkinson

[11] 3,908,066
[45] Sept. 23, 1975

[54] PROTECTING METAL AND METAL PRODUCTS

[75] Inventor: Robert E. Parkinson, Monroeville Borough, Pa.

[73] Assignee: United States Steel Corporation, Pittsburgh, Pa.

[22] Filed: Jan. 14, 1974

[21] Appl. No.: 432,922

Related U.S. Application Data

[62] Division of Ser. No. 359,372, May 11, 1973, Pat. No. 3,839,256.

[52] U.S. Cl. ............... 428/379; 427/58; 427/104; 427/120; 427/358; 427/387; 427/388; 427/391; 427/393; 427/421; 427/428; 427/435; 428/450; 428/461; 428/463
[51] Int. Cl.$^2$ .................... B32B 15/08; H01B 3/44
[58] Field of Search ............ 260/29.6 H, 29.6 WB, 260/29.6 RW, 448.2 N, 448.8 A, 827 E, 41 A; 117/135.1, 132 C, 232, 161 UT, 161 UC, 161 UH, 230; 427/58, 104, 120, 358, 387, 388, 391, 393, 421, 428, 435; 428/450, 461, 463

[56] References Cited
UNITED STATES PATENTS

| | | | |
|---|---|---|---|
| 3,239,549 | 3/1966 | Weldes | 260/448.2 |
| 3,248,237 | 4/1966 | Weldes et al. | 106/38.35 |
| 3,383,386 | 5/1968 | Weldes | 260/247.7 |
| 3,453,122 | 7/1969 | Weldes et al. | 117/135.1 X |
| 3,549,589 | 12/1970 | Meincke | 260/45.8 |
| 3,718,510 | 2/1973 | Patula et al. | 117/135.1 X |
| 3,832,326 | 8/1974 | North et al. | 117/232 X |

OTHER PUBLICATIONS
Weldes et al., Chem. Abs., 75: 120, 780z (1971).
Weldes et al., Chem. Abs., 67: 65, 526d (1967).

*Primary Examiner*—Harry J. Gwinnell
*Attorney, Agent, or Firm*—William L. Krayer

[57] ABSTRACT

A coating composition is disclosed comprising aqueous dispersions of copolymers, terpolymers, or ionomers of ethylene and ethylenically-unsaturated carboxylic acids or esters, blended with organic quaternary ammonium-silicate solutions. Coatings from these compositions are useful as electrical insulating coatings, particularly as applied to electrical steel sheets for magnetic cores, or to other metal sheets or wires, or as coatings or impregnants on other substrates. These organic/inorganic coatings have more heat resistance than purely organic coatings, and better adhesion, toughness, lubricity, and lack of abrasiveness than most inorganic coatings. When this coated steel is heated to high temperatures for annealing, a tightly adhering coating of essentially inorganic silica is retained which has excellent electrical insulating properties.

15 Claims, No Drawings

PROTECTING METAL AND METAL PRODUCTS

BACKGROUND OF THE INVENTION

This is a division, of application Ser. No. 359,372, filed May 11, 1973 now U.S. Pat. No. 3,839,256.

In the manufacture of grain-oriented electrical steel for use in magnetic cores of transformers or motors requiring the best possible magnetic properties, an inorganic coating such as "Core Plate 5" is usually applied as the final processing step. Such grain-oriented steel already has an oxide coating derived from the magnesia applied during the steel processing for protection during the anneal and its combination with iron and silicon oxides from the metal. The function of inorganic "Core Plate 5" is to improve the electrical insulation and cover the sheet more uniformly with a more adherent and denser coating than that of the natural oxides. A common coating composition is a slurry of phosphoric acid and alumina, or aluminum phosphate, and inert fillers like mica, which is applied as a thin coating and baked to dry it and react it with the original oxides. This coating must retain its insulation properties after a stress-relief anneal of as high as 845°C (1550°F) applied by the fabricator after slitting, punching, shearing, or winding the steel sheets. Sometimes non-oriented electrical steels are stress-relief annealed or otherwise heated by the fabricator and therefore have required an inorganic insulating coating. However, most non-oriented electrical steels do not require stress-relief annealing and are usually coated with an organic varnish (such as a phenol-formaldehyde-type called Core Plate 3, or an asphaltic-type called "Core Plate 1") for the purpose of insulation, lubrication, and corrosion protection.

Some disadvantages of the various coatings of the prior art are that (1) some of them employ organic solvents, which are relatively difficult to handle and create a pollution problem, (2) sticking during the annealing step, (3) the inorganic coatings are generally highly acid, corrosive and unstable in storage, (4) poor adhesion and cohesion causing spalling or dusting of the coating and (5) abrasiveness on the dies, punches or shears, and (6) they usually must be chosen for a specific job.

Although certain quaternary ammonium silicates have been used in preparing coatings of certain types, and although certain ethylene copolymers have been used to coat the various substrates, there has been no reason to combine them in the manner which I propose to achieve an electrical insulating, protective and lubricating coating.

SUMMARY OF THE INVENTION

The coatings applied from the compositions that I have developed can be made to meet the requirements of coatings for electrical steel and have certain substantial advantages over some of the materials now used.

a. They are water-based and therefore do not have the flammability and pollution problems of organic solvent-based varnishes.

b. The organic and inorganic components of these compositions can be balanced to give coatings with the lubricity, toughness and adhesion of the organic resins combined with the ability to leave a satisfactory high silicate residue coating with good insulation properties after most of the organic components are burned out during an anneal.

c. The handling of these compositions is more convenient than that of the usual inorganic coatings applied as highly acid slurries that are corrosive and unstable in storage. These new compositions may be low viscosity with high solids, and easily applied as thin coatings by conventional methods such as rolls, doctor-blades, sprays or dips.

d. The fact that a single composition of my new material may be applied to electrical steel of all types, replacing either the usual organic (Core Plate 3) or inorganic (Core Plate 5) type of coating, simplifies the production handling and facilities required.

My coating compositions consist of aqueous solutions of organic ammonium silicates, such as tetraethanol or methyltriethanol ammonium silicate (Quram 4D or 220 made by Philadelphia Quartz Co.) blended with organic resins, preferably in the form of dispersions or solutions, such as ethylene-acrylic acid copolymer solutions (e.g., EAA 9300 or 9500 ammonia dispersions from Union Carbide Corp.) or ethylene copolymer, terpolymer or ionomer dispersions (e.g., Elvax D dispersions from E. I. duPont de Nemours Co.). The organic ammonium silicates I use differ from ordinary inorganic alkali silicates in that the quaternary ammonium cation is volatile and can be driven off by heating at moderate temperatures leaving essentially a silica residue.

The organic quaternary ammonium silicates employed are described generally in U.S. Pat. Nos. 2,689,245, 3,239,521, 3,239,549 and 3,248,237, and are preferably of the general formula $WM_2O \cdot X(N_nR_p)_2O \cdot Y SiO_2 \cdot Z H_2O$ where W is a number from 0 to 1, X is a number from 0.33 to 1.5, Y is a number from 2 to 10, Z is a number from 1 to 20, M is an alkali metal, R is an organic radical that forms an NR base selected from alkyl, alkanol, and heterocyclic groups, each independently selected, having from 1 to 20 carbon atoms, $n$ is an integer from 1 to 10, and $p$ is at least 4.

Typical examples of such materials are methyltriethanol or tetraethanol-ammonium silicates ("Quram" from Philadelphia Quartz Company). These are commercially available as low-viscosity aqueous solutions with mole ratio of $SiO_2$/organic cation of 0.5 to 22.5 with silica weight up to 45 percent. They are also available as dry powders of mole ratio of 7.5 and higher, with up to 70 percent silica. The dry powder would have to be dissolved in water for use in my composition; it is generally more convenient to use an aqueous solution such as "Quram 220" with a mole ratio of 12.5 $SiO_2$/organic cation.

I have found that it is possible to substitute a separate alkali metal silicate solution (such as sodium silicate with a $SiO_2/Na_2O$ ratios of about 1.60 to 3.75) for up to about 75 percent of the original organic-ammonium silicate of the above general formula. Stated another way, my composition may include soluble alkali metal silicate in an amount up to about three times the amount of quaternary ammonium silicate.

The ethylene copolymers, terpolymers and ionomers are thermoplastics having many of the properties of polyethylene, but because the carboxyl and hydroxyl groups on their chains, have excellent adhesion to metal surfaces and can be reacted or cross-linked under certain conditions. The term "ionomer" as used throughout is intended to mean a copolymer of ethylene and a monomer, such as acrylic, methacrylic, or crotonic acid, in the salt form, and which may be cross-linked by ionic bonds. The term "neutralized" or partly neutralized polymer of ethylene and carboxylic acid containing monomer is intended to include such ionomers. The preferred ethylene-acrylic acid copolymers are those with high acid content (e.g. 18 to 24 percent), such as Union Carbide Corporation's EAA 9300 or EAA 9500, which can be dissolved as fluid, soap-like solutions or dispersions by heating with ammonium hydroxide or other alkali. Neutralization with volatile alkalis such as aqueous ammonia or amines is preferred for these coatings because the volatile alkalis may be driven off by heat, leaving a coating of the water-soluble original resin. These copolymer dispersions for use in my composition are prepared by placing the copolymer resin in a closed vessel with preferably an amount more than aqueous ammonia stoichiometric and heating to 90°C to 130°C with stirring until dissolved.

Preferred compositions of my invention are preferably prepared by forming a solution or dispersion of a quaternary ammonium silicate in a previously formed solution or dispersion of a copolymer of ethylene and a carboxylic acid containing monomer wherein the ethylene portion comprises about 60 to 90 weight percent, the ethylene polymer being in a solution of a volatile alkali.

Aqueous dispersions of other copolymers, terpolymers, or ionomers of ethylene with other ethylenically-unsaturated carboxylic acids (such as methacrylic or crotonic acids) or their esters, or with ethylenically-unsaturated esters, such as vinylacetate, may be substituted for all or part of the ethyleneacrylic acid copolymer solutions in volatile alkalis. The ethylene/vinyl acetate copolymers I use have from 60 to 90 weight percent ethylene and are available as colloidal dispersions with 42 to 50 percent total solids; however, any convenient concentration may be used. Typical examples of such resin dispersions are Elvax D dispersions from E. I. duPont de Nemours, Inc. Since these resins are usually not alkali soluble, their dispersions are generally prepared by emulsion polymerization and are stabilized by surfactants. Such resin dispersions may contribute stability and lower cost to my composition, but it is generally preferred to retain a substantial portion of ethyleneacrylic acid copolymer dispersion because it appears to cross-link and develop better high-temperature properties in coatings from my compositions, and also to assist in dispersion of minor additives such as fillers or oils.

Other additions to my composition may include stabilizing amines, such as monoethanolamine or morpholine, which are effective in stablizing the mixed dispersions to prevent gelling. My compositions are excellent media for the suspension of fillers, such as clays, talc, or mica, that may be desirable to improve the properties or reduce the cost of the coating. Pigments such as iron oxide or titania may be added for color or opacity. Surfactants may be added to provide better wetting or dispersion or to prevent foaming. Lubricants such as oils may be emulsified in the compound to improve lubricity or wear and abrasion resistance of the coatings. Thickeners may be added to control the viscosity of the dispersion. Other resins or resin-forming materials such as diacetone acrylamide or hexamethoxymethyl melamine or phenol-formaldehyde may be added to assist in cross-linking the ethylene polymers.

I have found that it is possible to blend these ethylene polymer dispersions and solutions with the organic-ammonium silicate solutions to give a fluid mixture that may be applied as a thin film to various substrates and then dried to give tough smooth adherent coatings. They may be prepared in weight ratios of $SiO_2$ (derived from the quaternary ammonium silicate) to polymer of from about 20:1 to 1:20, but preferably are prepared and used in weight ratios of from about 1:1 to 10:1 of $SiO_2$ to polymer.

Baking at 150°C for several minutes or as high as about 400°C for a few seconds gave satisfactory drying results. Coatings from these compositions are excellent as electrical insulating coatings, particularly as applied to electrical steel sheets for magnetic cores in coating thicknesses of about 1 to 5 microns (0.04 to 0.2 mil). The organic phase of the coating reduces the abrasiveness of the coating and gives more toughness or flexibility than the usual inorganic coatings for electrical steel. When these coated electrical steels were annealed at temperatures up to about 843°C, most of the organics were burned out leaving a tightly adhering coating of essentially silica darkened with some residual carbonaceous material. This annealed coating retained excellent electrical insulation properties and there was no carburizing or other deleterious effect on the electrical steel.

These compositions may also be used as coatings on substrates and other metals where their heat resistance (compared to most resin coatings) toughness, adhesion, lubricity and lack of abrasiveness (compared to purely inorganic coatings), or chemical resistance, wear resistance, and corrosion protection would be desirable. As coatings or impregnants for paper, wood and other porous materials, they may impart resistance to moisture, oils, and heat, or improve the strength or wear resistance of the material. Because of their excellent electrical and heat resistance, adhesion, and toughness, they are useful as coatings for wire.

Table I gives examples of formulae which I have found to be satisfactory, as related in the following examples.

Table I

Typical Formulae of Coating Compositions (parts by weight)

| | Example No. | | | | | |
|---|---|---|---|---|---|---|
| | 1 | 2 | 3 | 4 | 5 | 6 |
| Resin | | | | | | |
| Ammonia solution of Ethylene-Acrylic Acid Copolymer, *22% solution | 100 | 100 | — | — | 100 | 100 |
| Dispersion of Ethylene-Vinylacetate Copolymer** | — | — | 100 | — | — | — |
| Dispersion of Ethylene Ionomer** | — | — | — | 100 | 52 | 60 |

Table I—Continued

Typical Formulae of Coating Compositions (parts by weight)

| | Example No. | | | | | |
|---|---|---|---|---|---|---|
| | 1 | 2 | 3 | 4 | 5 | 6 |
| Silicate | | | | | | |
| Methyl-triethanol Ammonium Silicate Solution (Quram 220)*** | 100 | 200 | 100 | 300 | 272 | 200 |
| Sodium Silicate (N-Silicate***) | — | — | — | — | — | 67 |
| Misc. Additives | | | | | | |
| Monoethanolamine | 2–4 | — | 0 | 0–2 | 8 | 5.6 |
| Morpholine | — | 2–4 | — | — | — | — |
| Kaolin Clay Filler | — | — | — | — | — | 110 |
| Lubricant (mineral oil or fat) | — | — | — | — | — | 14 |
| Surfactants | — | — | — | — | — | 0.78 |

*EAA 9300 or EAA 9500 (Union Carbide Corporation)
**Elvax 1112 Copolymer Dispersion or Elvax D1249 or D1271 Ionomer Dispersions (E.I. duPont de Nemours, Inc.) These ionomers are partially neutralized ethylene/methacrylic acid copolymers.
***N-Silicate (Philadelphia Quartz Company)

EXAMPLES 1 and 2

In Examples 1 and 2, ethylene-acrylic acid copolymer (about 20% derived from acrylic acid), as the only organic resin, was blended as a 22% resin solids solution in aqueous ammonia with organic ammonium silicate solutions in the different proportions shown in the table. The addition of monoethanolamine as a stabilizer to the ethylene-acrylic acid dispersion before mixing into the silicate was found to be useful to prevent gelling. Morpholine was found to be effective in preventing gelling (but gave a higher viscosity) in Example 2, but gelling occurred rapidly in the higher organic/lower silicate, Example 1.

Stability of the mixture is also limited by the proportions of ethylene-acrylic acid resin to the silicate — the high silicate Example 2, was stable for several months, while Example 1 increased in viscosity so that it would be unsatisfactory for use without dilution in about two weeks. Higher EAA proportions gelled rapidly. Higher melt index EAA copolymers were more stable in these examples than low melt index EAA copolymers.

The coatings from Examples 1 and 2 roll-coated an oriented and non-oriented electrical steels were baked at 300°C for one to five minutes, giving dry film thicknesses of about one to 2.5 microns (0.04 to 0.10 mil). Example 1 coatings were smoother and thicker than Example 2. When coated oriented steel was stress-relief annealed at about 800° to 850°C (1475° to 1550°F) in a reducing atmosphere, Example 1 coatings were glossy, black, and very adherent while Example 2 coatings were duller gray and somewhat less adherent. Both of these coatings had no adverse effect on magnetic properties by the Epstein test (ASTM A343) and insulation of these very thin films was good, before and after annealing, by the Franklin test (ASTM A344).

EXAMPLES 3 and 4

In these examples, the dispersions of ethylene-vinyl acetate copolymers or ionomers were blended with the quaternary ammonium silicate. The mixtures were found to be very stable over a wide range of proportions. It was not necessary to add monoethanolamine or other amine as a stabilizing agent, as it was with ethylene-acrylic acid copolymers. These compounds were applied to electrical steel in the same manner as those of Examples 1 and 2, and the coatings were found to have equivalent properties.

EXAMPLE 5

This composition contained ethylene-acrylic acid copolymers and ethylene-ionomer dispersions blended with the organic quaternary ammonium silicate. This formula was preferred to the previous examples because it was more stable and gave smooth, uniform, adherent, abrasion-resistant coatings with excellent insulation properties. It was applied to electrical steels by roll-coating in a concentration of about 38 to 40 percent solids, and baked 1 to 3 minutes in an oven at 300°C or 30 seconds at about 400°C, giving smooth adherent coatings with excellent electrical insulation as may be seen from the following data. When these coated steel sheets were annealed at about 845°C, a smooth, dark adherent coating remained with excellent insulation properties (0.00 to 0.10 ampere by the Franklin Test, ASTMA 344.68, at 150°C, 300 psi).

EXAMPLE 6

In this example, sodium silicate was substituted for a portion of the organic ammonium silicate and a kaolin clay filler was added in order to reduce the cost of the composition. It was found to be desirable to emulsify a small amount of lubricating oil or fat in the composition to improve the resistance of the coating to abrasion or wear when coated sheets were rubbed together. When applied and baked as in Example 5, the coating results were similar except that they were less glossy.

I do not intend to be restricted to the above specific illustrations and examples of my invention. It may be otherwise variously practiced within the scope of the following claims.

I claim:

1. Method of protecting metal comprising applying to said metal a coating of a composition comprising a solution or dispersion in an aqueous medium of
   a. quaternary ammonium silicate of the formula $WM_2O \cdot X(N_nR_p)_2O \cdot Y\ SiO_2 \cdot Z\ H_2O$ where W is a number from 0 to 1, X is a number from 0.33 to 1.5, Y is a number from 2 to 10, Z is a number from 1 to 20, M is an alkali metal, R is an organic radical that forms an NR base selected from alkyl, alkanol, and heterocyclic groups, each independently selected, having from 1 to 20 carbon atoms, $n$ is an integer from 1 to 10, and $p$ is at least 4, and
   b. ethylene polymer selected from the group consisting of copolymers, terpolymers and ionomers of ethylene with acrylic, methacrylic or crotonic acids or esters thereof or vinyl acetate, the weight ratio of $SiO_2$ derived from the quaternary ammonium silicate to ethylene polymer being from about 20:1 to about 1:20, and drying said coated metal.

2. Method of claim 1 in which the coating after drying is about 1 to 5 microns thick.

3. Method of claim 1 in which the quaternary ammonium silicate is in the form of an aqueous solution and the ethylene polymer is in the form of an aqueous solution, dispersion or latex.

4. Method of claim 1 wherein about 60 to about 90 weight percent of the ethylene polymer is derived from ethylene.

5. Method of claim 1 in which $(N_nR_p)$ is $CH_3-N(CH_2CH_2OH)_3$.

6. Method of claim 1 in which $(N_nR_p)$ is $N(CH_2CH_2OH)_4$.

7. Metal coated with a dried composition comprising a solution or dispersion in an aqueous medium of
   a. quaternary ammonium silicate of the formula $WM_2O \cdot X(N_nR_p)_2O \cdot Y\ SiO_2 \cdot Z\ H_2O$ where W is a number from 0 to 1, X is a number from 0.33 to 1.5, Y is a number from 2 to 10, Z is a number from 1 to 20, M is an alkali metal, R is an organic radical that forms an NR base selected from alkyl, alkanol, and heterocyclic groups, each independently selected, having from 1 to 20 carbon atoms, $n$ is an integer from 1 to 10, and $p$ is at least 4, and
   b. ethylene polymer selected from the group consisting of copolymers, terpolymers and ionomers of ethylene with acrylic, methacrylic or crotonic acids or esters thereof or vinyl acetate, the weight ratio of $SiO_2$ derived from the quaternary ammonium silicate to ethylene polymer being from about 20:1 to about 1:20.

8. Metal coated as in claim 7 in which the quaternary ammonium silicate is in the form of an aqueous solution and the ethylene polymer is in the form of an aqueous solution, dispersion or latex.

9. Metal coated as in claim 7 in which the ethylene polymer is an ammonium, alkali metal or volatile alkali ionomer.

10. Metal coated as in claim 7 wherein about 60 to about 90 weight percent of the ethylene polymer is derived from ethylene.

11. Metal coated as in claim 7 in which $(N_nR_p)$ is $CH_3-N(CH_2CH_2OH)_3$.

12. Metal coated as in claim 7 in which $(N_nR_p)$ is $N(CH_2CH_2OH)_4$.

13. Metal coated as in claim 7 in which the weight ratio of $SiO_2$ to ethylene polymer is from about 1:1 to about 10:1.

14. Electrical sheet having an electrically insulating dried coating thereon of a composition comprising a solution or dispersion of an aqueous medium of
   a. quaternary ammonium silicate of the formula $WM_2O \cdot X(N_nR_p)_2O \cdot Y\ SiO_2 \cdot Z\ H_2O$ where W is a number from 0 to 1, X is a number from 0.33 to 1.5, Y is a number from 2 to 10, Z is a number from 1 to 20, M is an alkali metal, R is an organic radical that forms an NR base selected from alkyl, alkanol, and heterocyclic groups, each independently selected, having from 1 to 20 carbon atoms, $n$ is an integer from 1 to 10, and $p$ is at least 4, and
   b. ethylene polymer selected from the group consisting of copolymers, terpolymers and ionomers of ethylene with acrylic, methacrylic or crotonic acids or esters thereof or vinyl acetate, the weight ratio of $SiO_2$ derived from the quaternary ammonium silicate to ethylene polymer being from about 20:1 to about 1:20.

15. Wire having an electrically insulating dried coating thereon of a composition comprising a solution or dispersion in an aqueous medium of
   a. quaternary ammonium silicate of the formula $WM_2O \cdot X(N_nR_p)_2O \cdot Y\ SiO_2 \cdot Z\ H_2O$ where W is a number from 0 to 1, X is a number from 0.33 to 1.5, Y is a number from 2 to 10, Z is a number from 1 to 20, M is an alkali metal, R is an organic radical that forms an NR base selected from alkyl, alkanol, and heterocyclic groups, each independently selected, having from 1 to 20 carbon atoms, $n$ is an integer from 1 to 10, and $p$ is at least 4, and
   b. ethylene polymer selected from the group consisting of copolymers, terpolymers and ionomers of ethylene with acrylic, methacrylic or crotonic acids or esters thereof or vinyl acetate, the weight ratio of $SiO_2$ derived from the quaternary ammonium silicate to ethylene polymer being from about 20:1 to about 1:20.

\* \* \* \* \*

UNITED STATES PATENT OFFICE
CERTIFICATE OF CORRECTION

Patent No. 3,908,066　　　　　Dated September 23, 1975

Inventor(s) Robert E. Parkinson

It is certified that error appears in the above-identified patent and that said Letters Patent are hereby corrected as shown below:

Column 3, line 13, at the beginning of the line, "soluble" should read -- insoluble --.

Signed and Sealed this thirtieth Day of December 1975

[SEAL]

Attest:

RUTH C. MASON
*Attesting Officer*

C. MARSHALL DANN
*Commissioner of Patents and Trademarks*